United States Patent [19]

Perego

[11] Patent Number: 5,531,397
[45] Date of Patent: Jul. 2, 1996

[54] CONTINUOUS FEED AND DISCHARGE FLOW THROUGH CASSETTE LOADING APPARATUS AND SYSTEM

[75] Inventor: Luciano Perego, Mezzago, Italy

[73] Assignee: Tapematic U.S.A., Inc., Orlando, Fla.

[21] Appl. No.: 435,192

[22] Filed: May 5, 1995

Related U.S. Application Data

[62] Division of Ser. No. 201,480, Feb. 23, 1994, which is a continuation of Ser. No. 801,261, Dec. 3, 1991, abandoned, which is a division of Ser. No. 479,231, Feb. 12, 1990, Pat. No. 5,118,045, which is a continuation of Ser. No. 314,409, Feb. 22, 1989, abandoned.

[30] Foreign Application Priority Data

Dec. 29, 1988 [IT] Italy ....................... 23152/88

[51] Int. Cl.⁶ .................................. B65H 54/22
[52] U.S. Cl. ........................................ 242/532.1
[58] Field of Search ................ 242/532.1; 198/457, 198/467.6

[56] References Cited

U.S. PATENT DOCUMENTS

| | | |
|---|---|---|
| 3,814,343 | 6/1971 | Bennett et al. . |
| 3,940,080 | 2/1976 | Bennet . |
| 3,997,123 | 12/1976 | King . |
| 4,061,286 | 12/1977 | King, Sr. et al. . |
| 4,136,838 | 1/1979 | Bosco . |
| 4,332,355 | 6/1982 | Zopfy et al. . |
| 4,486,262 | 12/1984 | Woodley . |
| 4,519,553 | 5/1985 | Campbell et al. . |
| 4,589,608 | 5/1986 | Rehklau et al. . |
| 4,595,327 | 6/1986 | Woodley . |
| 4,602,748 | 7/1986 | Woodley . |
| 4,629,138 | 12/1986 | Kubo . |
| 4,657,197 | 4/1987 | Farrow . |
| 4,699,328 | 10/1987 | Kreeft et al. . |
| 4,738,408 | 4/1988 | Odaka et al. . |
| 4,836,464 | 6/1989 | Perego . |
| 4,854,517 | 8/1989 | Watanabe et al. . |
| 4,979,690 | 12/1990 | Kita . |
| 5,118,045 | 6/1992 | Perego . |
| 5,152,473 | 10/1992 | Perego . |

FOREIGN PATENT DOCUMENTS

| | | |
|---|---|---|
| 2834598 | 2/1979 | Germany . |
| 2093801 | 9/1982 | United Kingdom . |

*Primary Examiner*—John P. Darling
*Attorney, Agent, or Firm*—Edgar H. Haug

[57] ABSTRACT

Cassettes are released from a remote loading station onto a supply conveyor. The cassettes travel on the supply conveyor to a flow-through tape loading machine in a response to a request from the tape loading machine. The cassettes are transported through the tape loading machine from the back to the front. The cassettes are moved across the face of the machine where they are loaded with tape. The cassettes are then transported back through the machine to a discharge conveyor. The cassettes are removed from the discharge conveyor at a remote packing station. The packing can be done either manually or automatically.

4 Claims, 5 Drawing Sheets

CONTINUOUS FEED AND DISCHARGE FLOW THROUGH CASSETTE LOADING APPARATUS AND SYSTEM

This application is a divisional of Ser. No. 08/201,480, filed on Feb. 23, 1994, which is a continuation application of Ser. No. 07/801,261, filed on Dec. 3, 1991, now abandoned which is a divisional application of Ser. No. 07/479,231, filed Feb. 12, 1990, now U.S. Pat. No. 5,118,045 which is a continuation application of Ser. No. 07/314,409, filed Feb. 22, 1989 now abandoned.

BACKGROUND OF THE INVENTION

1. Field of the Invention

The instant invention relates generally to machines and systems for loading tape into cassettes and, more particularly, to flow through cassette loading machines and systems having continuous cassette input and continuous cassette discharge capabilities.

2. Description of the Prior Art

Equipment for automatically winding blank or pre-recorded magnetic tape into a cassette, for instance, an audio cassette or video cassette, is known. Such devices are disclosed in U.S. Pat. Nos. 3,997,123 and 3,814,343.

Typically, blank or pre-recorded magnetic tape is provided on a supply reel or "pancake" which is mounted on a hub on the cassette loading machine. The blank or pre-recorded tape on the pancake is commonly referred to as "use tape".

A cassette, prior to loading, generally has two hubs located inside a plastic casing, connected by a leader. An empty audio cassette is called a C-0 and an empty video cassette is called a V-0. Empty cassettes are manually or automatically fed into a tape loading station of the cassette loading machine to begin the tape loading operation. A portion of the leader of the empty cassette is extracted from the cassette and cut into two pieces by a cutter mechanism. Use tape from the pancake is spliced to one of the ends of the two cut leader pieces, and a pre-determined length of the use tape is wound onto the associated cassette hub by a winding spindle. For instance, enough blank use tape for 30, 60, 90 or 120 minutes of recording time may be wound onto the cassette hub. Alternatively, a portion of use tape containing a pre-recorded program (e.g., a record album or a movie) may be wound onto the cassette hub.

A control system synchronizes the motors that turn the winding spindle and the supply reel hub in order to maintain proper tension on the use tape during the winding operation. After the correct amount of use tape is wound onto the cassette hub, the use tape is cut and the cut section of the use tape is spliced to the remaining leader piece. The now completely loaded cassette is ejected or removed from the tape winding unit and a subsequent empty cassette is inserted. The tape loading and winding operation is then repeated.

Initially, cassette loaders required manual insertion of each individual cassette and manual placement of the leader over the splicing blocks. Likewise, the filled cassette had to manually be ejected from the loading position. Subsequently, mechanisms have been developed to automatically feed cassettes into the tape winding unit, automatically extract the leader from the cassette, and automatically eject the cassette. Further, in order to reduce equipment down time and increase efficiency, cassette loading machines with two hubs capable of supporting two supply reels were developed. These so called "double pancake" machines eliminated down time that occurred when the single supply reel was out of use tape. With a double pancake machine, the empty supply reel is simply replaced while the second supply reel is in use.

Further automation of this process has occurred within the last few years. Systems now exist with conveyors which provide a semi-continuous flow of empty cassettes to a tape loading machine. The conveyors of these systems are located in front, over the top and to the side of the tape loading machine. They frequently prevent the machine from being easily accessed or removed for maintenance. Further, such systems incorporate standard tape loading machines which require the cassette to be dropped or slid from an input conveyor into the machine's magazine. This drop or slide into the magazine can mar the cassette case. Further, because a magazine is being filled, the machine must rely on the conveyor to maintain the cassette supply. There is no direct interaction between the machine and a cassette supply mechanism.

OBJECTS OF THE INVENTION

A primary object of the present invention is to provide a continuous feed and discharge flow through cassette tape loader.

Another object is to provide a cassette loading machine capable of removing empty cassettes from a conveyor, bringing them through the machine and maintaining such cassettes wholly within the control of the machine until returned to a conveyor after loading.

An additional object is to provide a cassette tape loading system having independent conveyor(s) located adjacent to a cassette loading machine such that access to the machine is unimpeded for maintenance or removal purposes.

A further object is to provide a high production, high capacity cassette loading system that minimizes labor costs by limiting the need for human intervention.

A still further object is to provide a tape loading machine that handles cassettes gently so that the casing of the cassettes is not marred during the infeed transport, loading and outfeed transport operations.

Yet another object is to provide a completely automated cassette loading system including automatic placement of empty cassettes on a supply conveyor, automatic loading of empty cassettes and automatic packing of loaded (full) cassettes.

SUMMARY OF THE INVENTION

The automatic cassette loading system of the present invention has a remote loading station where cassettes are placed or fed onto a supply conveyor by manual or automatic means. The blank cassettes travel on the supply conveyor away from the remote loading station to a flow control station where they form a queue behind a release mechanism. (The flow control station is unnecessary if the cassettes are fed onto the supply conveyor by automatic means responsive to electronic signals from a tape loading machine.) The release mechanism releases cassettes from the queue one at a time in response to a signal from a tape loading machine in need of an empty cassette. The cassette then travels on the supply conveyor towards the tape loading machine. If more than one machine calls for a cassette at the same time, the cassettes are released one right after another at a predetermined distance or time interval.

Sensors connected to the tape loading machine detect when a blank cassette is near the machine on the supply conveyor. When the sensors signal that a cassette is nearby a pick-up arm is raised which removes the empty cassette from the supply conveyor. The arm raises the cassette off the conveyor and then slides it gently onto an in-feed conveyor which carries the cassette into the cassette loading machine.

The empty cassette moves on the in-feed conveyor until it comes to the end of the conveyor or abuts a cassette already on the conveyor. When the tape loading machine is ready, the cassette on the end of the feed conveyor is rotated 90° until it rests on a top support surface of a moveable support means. The support means lowers the empty cassette into a receptor means which grasps the cassette. The receptor means pulls the cassette inwardly into a tape loading station where the leader is first extracted from the empty cassette and then cut into two pieces. The leading end of tape from a supply reel of use tape is spliced to one free end of the leader. A predetermined amount of use tape is then wound into the cassette by a winding mechanism. The use tape is then cut and the second, remaining end of the leader is spliced to the use tape.

While the cassette is in its inward, loading position, the support means moves back up to its starting position where it supports the next empty cassette rotated down from the in-feed conveyor. After the cassette is completely loaded with tape, the receptor means moves it outwardly onto a second, lower support surface of the support means. The support means moves downwardly bringing a new empty cassette into the loading position and simultaneously bringing the now full cassette to a point where it is rotated 90° onto an out-feed conveyor.

The full cassette is carried by the out-feed conveyor, through the machine, toward a discharge conveyor. Before the full cassette is released onto the discharge conveyor, a sensor means, attached to the tape loading machine, scans the conveyor to insure that no other cassettes will interfere with the full cassette's release. If the sensor detects no other cassettes in the release area, the full cassette is carried to the end of the out-feed conveyor and dropped gently onto the discharge conveyor. Full cassettes are carried by the discharge conveyor to a manual or automatic remote packing station which may include a labeling mechanism and/or boxing mechanism. The whole process repeats itself, thereby providing a continuous feed and discharge cassette loading operation.

THE DETAILED DESCRIPTION OF THE PREFERRED EMBODIMENT

Figure 1:
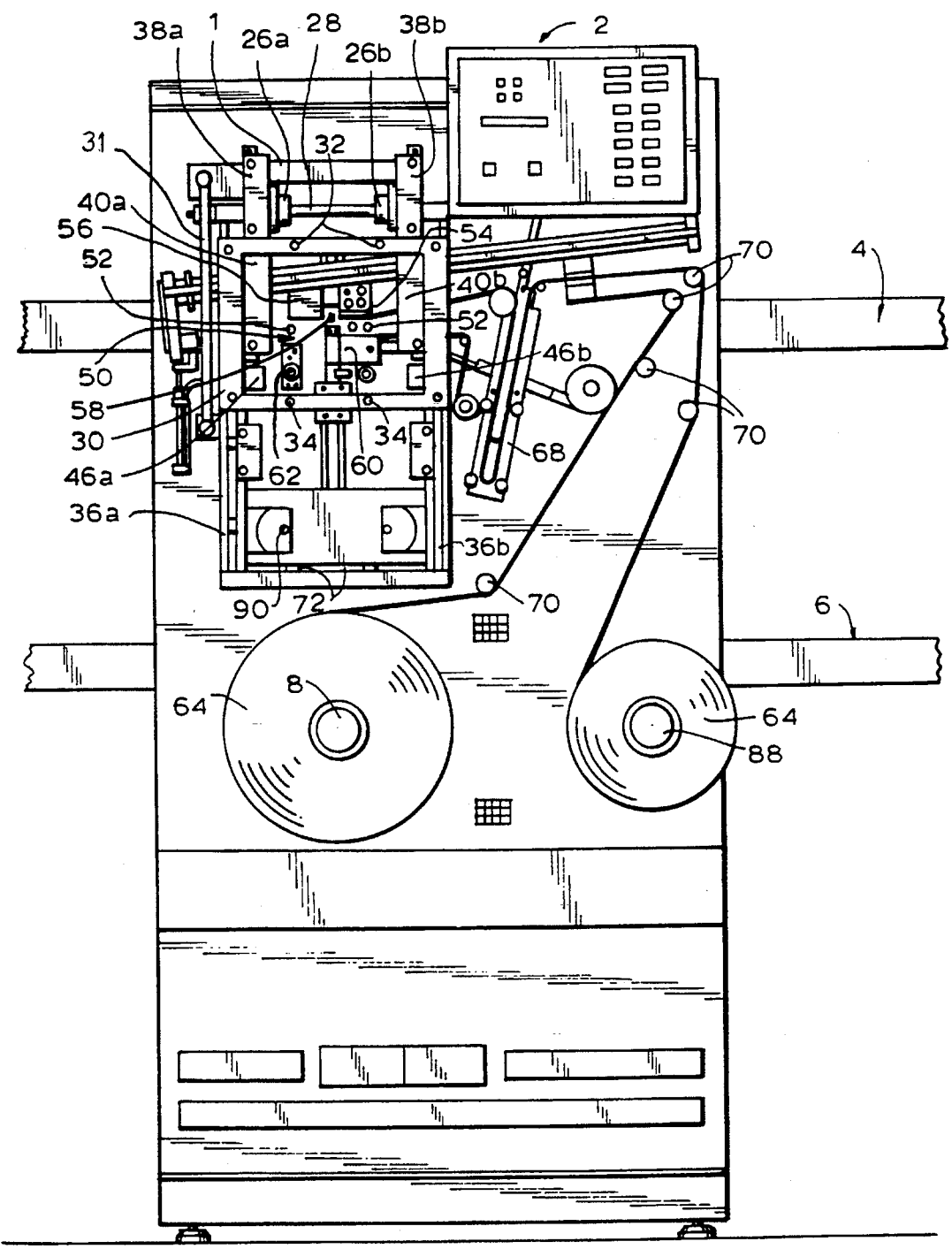
FIG. 1 is a front elevational view of the flow through machine of the present invention.
Figure 2:
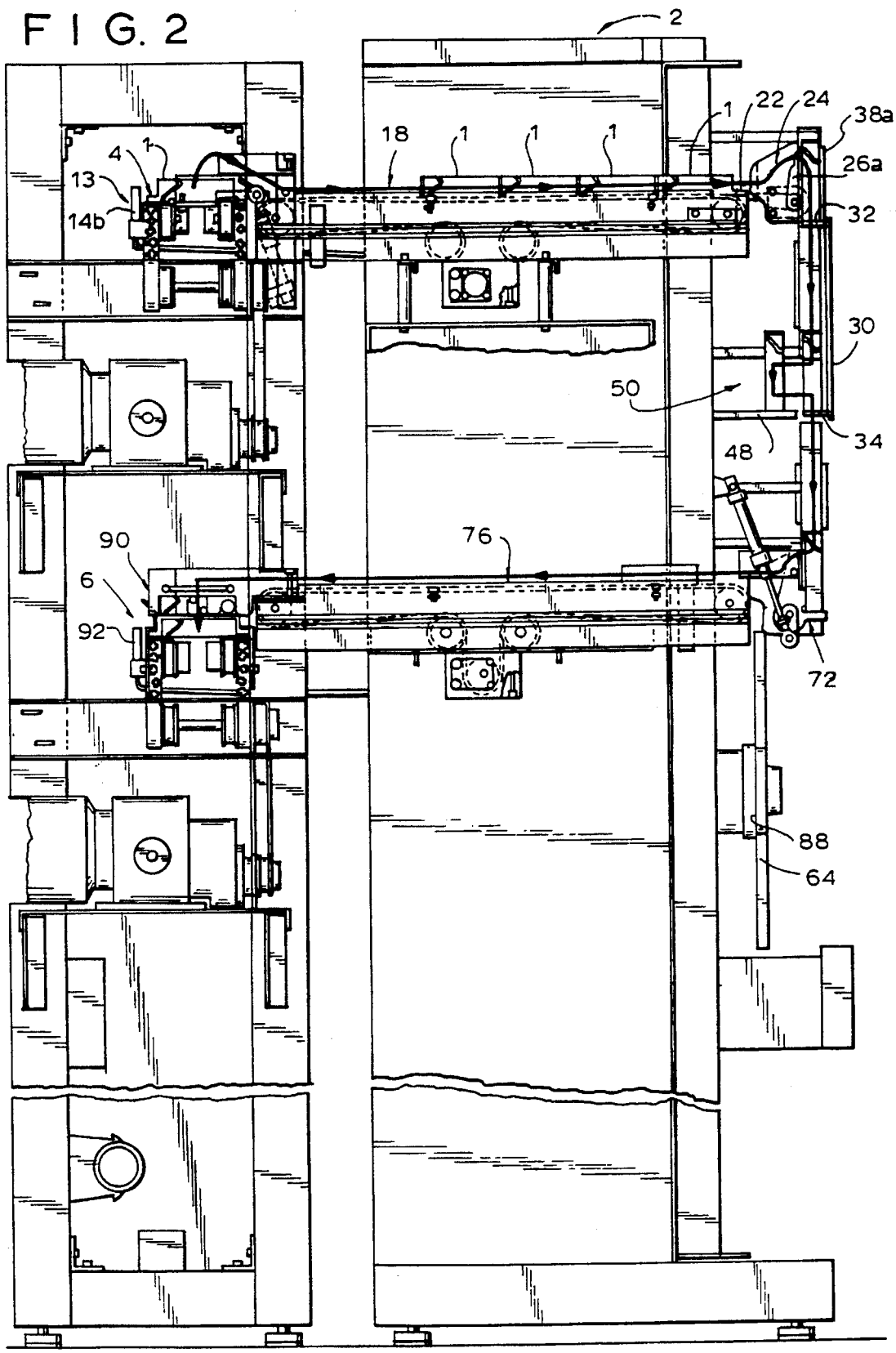
FIG. 2 is a side elevational view of the flow through machine of the present invention.
Figure 3:
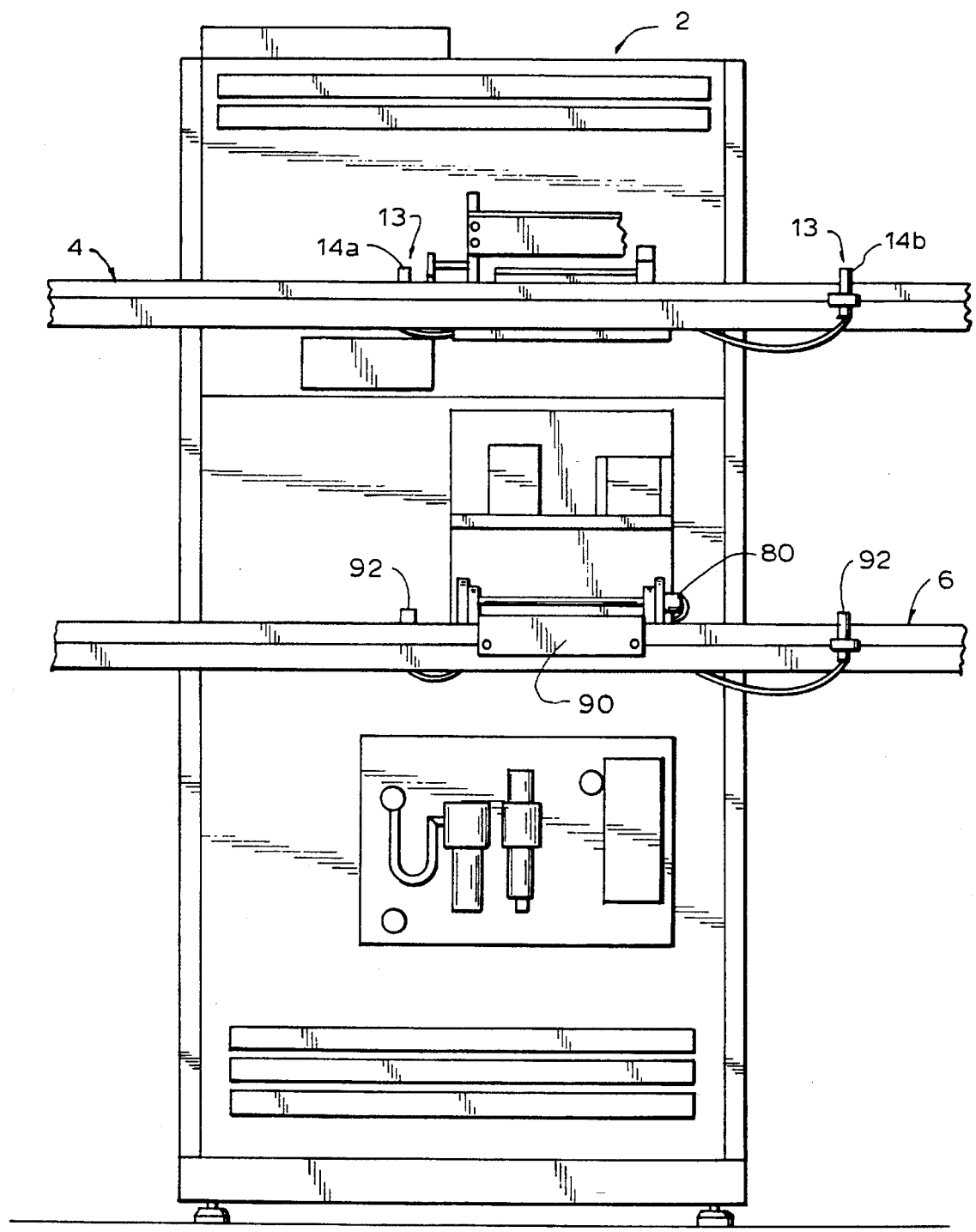
FIG. 3 is a rear elevational view of the flow through machine of the present invention.
Figure 4:
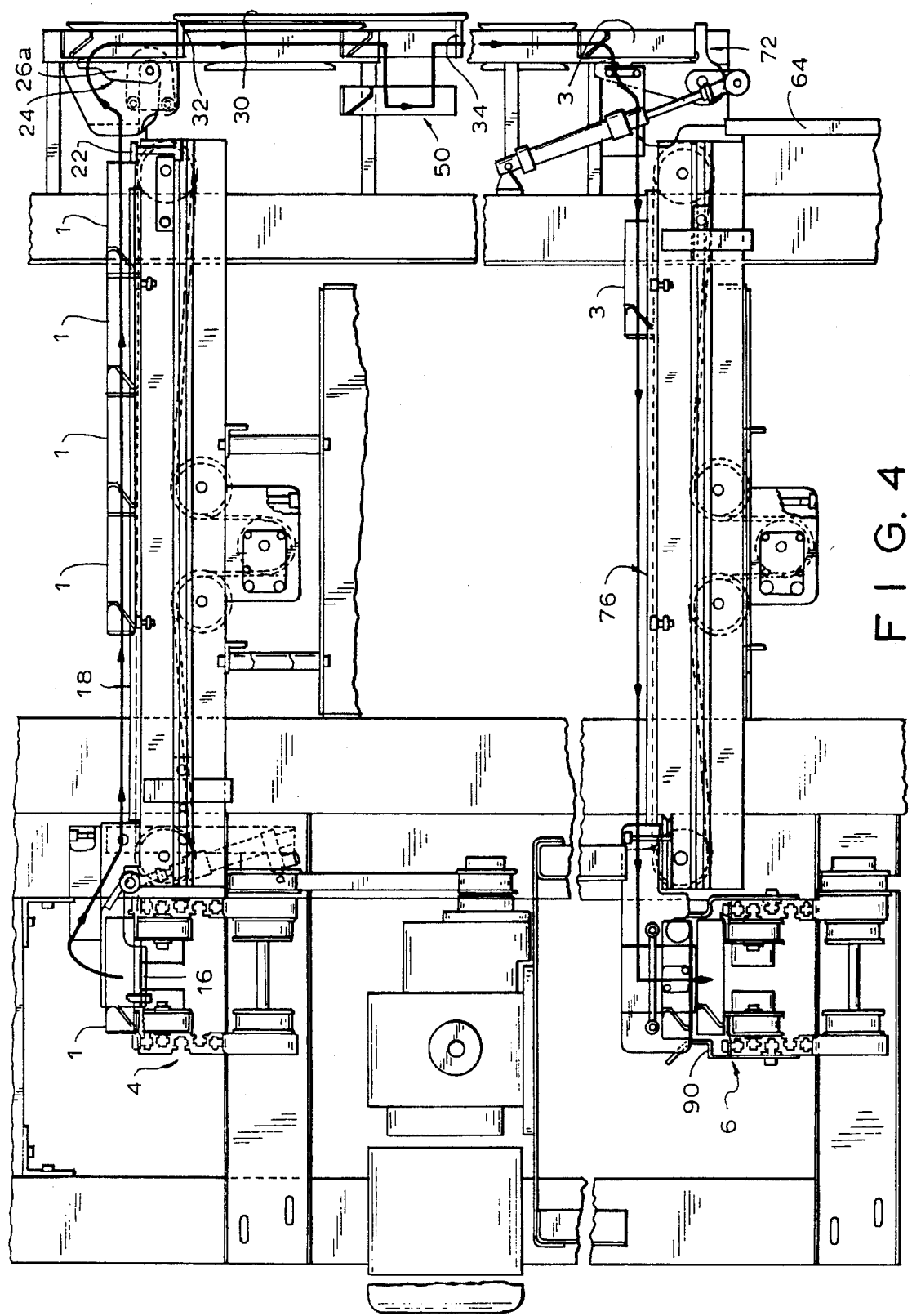
FIG. 4 is an enlarged side, cross-sectional view of the flow path of a cassette through the flow through machine of the present invention.
Figure 5:
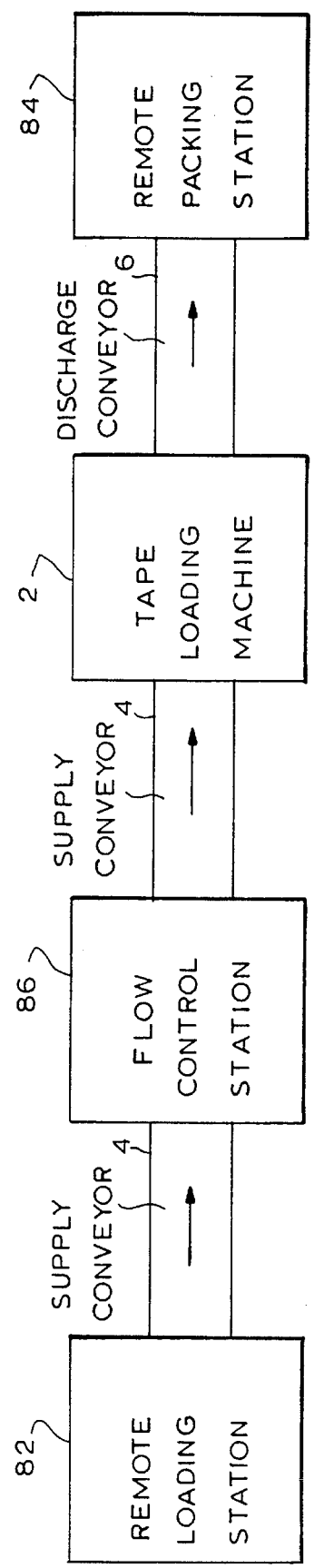
FIG. 5 is a schematic representation of the continuous feed and discharge cassette loading system of the present invention.

Referring to FIG. 1 and FIG. 5, empty cassettes 1 are placed on a cassette supply conveyor 4 at a remote loading station 82. The empty cassettes 1 are placed on the cassette supply conveyor 4 at the remote loading station 82 by manual means (i.e. human hands), automatic means (e.g. a high density stacker/feeder) or by direct feed out of a cassette assembly machine (not shown). Once the cassettes 1 are placed on the supply conveyor 4 they move along unimpeded until they come to a flow control station 86. At the flow control station 86, a release means (not shown), releases the cassettes 1 one at a time, in response to an electronic "call" from a cassette loading machine 2. (The flow control station 86 is unnecessary if an automatic means responsive to machine "calls" is employed.) A number of cassettes 1 may form a queue behind the cassette release mechanism at the flow control station 86 if the "calls" from the cassette loading machines 2 do not keep up with the incoming supply of cassettes 1 from the remote loading station 82. Because cassettes are likely to back up on the supply conveyor 4 at the flow control station 86, a conveyor belt of a material which does not mar the cassette shell is employed.

As indicated above, the release mechanism releases cassettes 1 in response to a "call" from a cassette loading machine 2. Each machine 2 "calls" for cassettes I until it reaches its capacity. The machine 2 is at capacity when six cassettes 1 are within its direct control. If a number of cassette loading machines 2 request cassettes 1 at the same time, the release mechanism releases cassettes 1 from the queue, one at a time, in a predetermined time sequence.

When the machine 2 calls for a cassette, an L-shaped pick-up arm 16 drops down to the supply conveyor 4. Photo electric sensor means 13 which comprises elements 14a and b, is mounted on the supply conveyor 4, adjacent to each cassette loading machine 2. Sensor means 13, indicates when the conveyor 4 is clear so the arm 16 doesn't hit a passing cassette 1 when it drops down to the conveyor 4. The arm 16, which is made of aluminum sprayed with nylon paint, raises a cassette 1 off the supply conveyor 4 when a sensor, mounted on the arm 16 (not shown), indicates the cassette 1 is completely on the arm 16. The arm 16 raises the cassette 1 until it reaches an angle of approximately 45° above an in-feed conveyor 18. At that point the cassette 1 slides gently onto the in-feed conveyor 18, the beginning of which is located at the back of the cassette loading machine 2. If the in-feed conveyor 18 is full, the cassette 1 remains on the arm 16 and the sensor indicates that the machine 2 is full. The in-feed conveyor 18 carries the cassette 1 forward into the cassette loading machine 2 until it reaches the end of the conveyor 18 or abuts another cassette 1 already on the conveyor 18. At the end of the in-feed conveyor 18 is a stop mechanism 22 which holds the cassette(s) 1 in place on the conveyor 18 until the machine 2 "needs" another empty cassette 1. When the stop mechanism 22 releases the cassette 1 an upper rotation mechanism 24, comprised of two turn members 26a and b having a bar 28 between them, rotates the cassette 1 approximately 90° to a vertical position. A pair of vertical stop pieces 38a and b maintain the cassette 1 in a vertical position. The cassette 1 is also supported by a plurality of top support pins 32 which are part of a moveable support cage 30. The support cage 30 is driven by a belt 31 and rides on rails 36a and b which guide the cage 30 up and down along the face of the machine 2.

The support cage 30 lowers the empty cassette 1 through a pair of upper guide pieces 40a and b into two U-shaped arms 46a and b which hold the cassette 1 on either side. The cassette 1 is then pulled inwardly into a loading station 50 by the arms 46a and b, where it rests on loading station supports 48. At the loading station 50 an extractor 52 removes the leader (not shown) from the cassette 1 and places it in a groove (not shown) in a block and also in a contiguous first groove (not shown) in an adjacent block 56. A cutter 58, cuts the leader into two separate pieces. One end of the leader remains on the block 54 and the second end remains in the first groove on the block 56. At least one reel of use tape 64 is located on at least one hub 88 on the front of the machine 2. The free end of the use tape 64 is wound through a series of guide rollers 70, and a control means 68 and is ultimately placed in a second groove (not shown) on the block 56.

The block 56 is shifted to bring the second groove, having the free end of the use tape 64 therein, into alignment with the single groove on the block 54. The free end of the use tape 64 is then spliced, with a splicing mechanism 60, to the end of the leader which is on the block 54. A wind spindle 62 fits in a hub 90 of the cassette and winds a predetermined amount of use tape 64 into the cassette 1. When the winding process is complete, the cutter 58 cuts the use tape 64 leaving one free end in the single groove of the block 54 and the second free end in the second groove of the block 56. The block 56 then shifts to bring the second end of the leader, which is in the first groove of the block 56, into alignment with the end of the use tape now in the single groove of block 54. The splicing mechanism 60 then applies a splice that joins the end of the leader to the end of the use tape 64 now in the cassette 1. The wind spindle 62 then "jogs" the cassette hub to bring all the remaining tape into the cassette 1 and off the blocks 54 and 56. At this point the cassette 1 is completely loaded. The now full cassette 3 is pushed outwardly to its original position away from the loading station 50 by U-shaped arms 46a and b.

While the cassette 1 is in the loading station 50, the moveable support cage 30 returns to its top position to receive (support) the next empty cassette 1. Thus, when the U-shaped arms 46a and b return the full cassette 3 to the outer, starting position, the cassette 3 is placed on a pair of bottom support pins 34 on the lower part of the support cage 30. The support cage 30 then travels downwardly to its second, lower position bringing a new empty cassette 1 into the U-shaped arms 46a and b. At the same time, this brings the full cassette 3 to a lower rotation member 72 which rotates the cassette approximately 90° to a horizontal position, thereby placing it on an out-feed conveyor 76. The out-feed conveyor 76 carries the full cassette 3 back through the machine 2 towards a discharge conveyor 6. Photoelectric sensors 92, which are connected to the machine 2, scan the conveyor 6 to insure that no cassette will interfere with the release of a full cassette 3 from the out-feed conveyor 76. If there is no obstruction, the full cassette 3 is carried to the end of the out-feed conveyor 76 and gently released by a release mechanism 80 through a guide chute 90 onto the discharge conveyor 6.

The discharge conveyor 6 carries the full cassette 3 to a remote packing station 84. The remote packing station 84 can include automated boxing and labeling devices as well as an automatic or manual packing system.

While the tape loading machine 2 of the present invention is primarily designed for handling video cassettes this system can easily be adapted to accommodate audio or computer cassettes.

Although the present invention has been described with reference to specific embodiments, neither the described dimensions, nor the materials mentioned should be construed as limited to the details disclosed herein, as the disclosed embodiments are merely illustrative of the invention.

I claim:

1. An apparatus for transferring a cassette to a tape loading machine from a conveyor having a supporting surface comprising:

pickup means movable between a first position below the supporting surface of the conveyor and a second position above said supporting surface; and sensor means for generating a signal in response to the detection of the presence of a cassette in proximity to said pickup means, wherein said pickup means is movable from said first position to said second position in response to said signal such that a cassette slides, under the influence of gravity, into engagement with a tape loading machine.

2. A method of transferring a cassette from a conveyor to a tape loading machine comprising the steps of:

moving a pickup device down to the conveyor; sensing the presence of a cassette in proximity to said pickup device;

moving said cassette upwardly with said pickup device to a position above a cassette's initial point of engagement with the tape loading machine; allowing the cassette to slide downwardly off the pickup device, under the influence of gravity, to a point of engagement with the tape loading machine.

3. An apparatus for transferring a cassette to a tape loading machine from a conveyor having a supporting surface comprising:

pickup means movable between a first position below the supporting surface of the conveyor and a second position above said supporting surface; and sensor means for generating a signal in response to the detection of the presence of a cassette in proximity to said pickup means, wherein said pickup means is movable from said first position to said second position in response to said signal such that a cassette slides, under the influence of gravity, into engagement with a tape loading machine, wherein said supporting surface of said conveyor comprises a plurality of spaced apart belts.

4. An apparatus according to claim 3, wherein said pickup means is located between at least two of said plurality of belts when it is in said first position.

* * * * *